United States Patent
Barrow et al.

(10) Patent No.: US 8,036,648 B1
(45) Date of Patent: Oct. 11, 2011

(54) SYSTEM AND METHOD FOR OPERATING A USER FUNCTIONALITY IN A MOBILE COMMUNICATIONS DEVICE

(75) Inventors: Steven W. Barrow, South Riding, VA (US); Safwan A. Khan, Gainesville, VA (US)

(73) Assignee: Nextel Communications, Inc., Reston, VA (US)

( * ) Notice: Subject to any disclaimer, the term of this patent is extended or adjusted under 35 U.S.C. 154(b) by 935 days.

(21) Appl. No.: 11/652,913

(22) Filed: Jan. 12, 2007

(51) Int. Cl.
*H04M 3/42* (2006.01)

(52) U.S. Cl. ....... 455/416; 455/518; 455/428; 455/90.2; 370/401

(58) Field of Classification Search .................. 455/518, 455/90.2, 519, 416, 428; 370/392, 401, 465
See application file for complete search history.

(56) References Cited

U.S. PATENT DOCUMENTS

| | | | | |
|---|---|---|---|---|
| 7,379,735 | B2 * | 5/2008 | Villa et al. | 455/426.1 |
| 7,522,572 | B2 * | 4/2009 | Karaoguz | 370/338 |
| 2004/0037312 | A1 * | 2/2004 | Spear | 370/465 |
| 2005/0192041 | A1 * | 9/2005 | Oxley et al. | 455/519 |
| 2006/0148503 | A1 * | 7/2006 | Lasisi et al. | 455/518 |
| 2007/0123285 | A1 * | 5/2007 | Baudino et al. | 455/518 |
| 2007/0140255 | A1 * | 6/2007 | Gautier et al. | 370/395.5 |
| 2007/0270190 | A1 * | 11/2007 | Hisky et al. | 455/570 |
| 2007/0284474 | A1 * | 12/2007 | Olson et al. | 244/10 |
| 2008/0144640 | A1 * | 6/2008 | Alonso | 370/401 |

* cited by examiner

*Primary Examiner* — Kamran Afshar
*Assistant Examiner* — Mong-Thuy Tran

(57) ABSTRACT

A system and method for operating a user functionality in a mobile communications device is disclosed. In an embodiment of the system, a communications infrastructure provides interoperability between a first communications network utilizing a first technology and a second communications network utilizing a second technology. The infrastructure provides an indicator to a mobile communications device in communication with the first communications network to either activate the user functionality or deactivate the user functionality. In accordance with an embodiment of a method of the present invention, the method includes providing the indicator to the mobile communications device in communication with the first communications network utilizing the first technology by the communications infrastructure. The user functionality is activated if the indicator is provided in a first state and the user functionality deactivated if the indicator is provided in a second state.

16 Claims, 2 Drawing Sheets

SYSTEM AND METHOD FOR OPERATING A USER FUNCTIONALITY IN A MOBILE COMMUNICATIONS DEVICE

FIELD OF THE INVENTION

The present invention relates generally to the field of telecommunications, and in particular, to a system and method for operating a user functionality in a mobile communications device.

BACKGROUND OF THE INVENTION

Dispatch calls are becoming more and more popular with subscribers of communications networks. As is known, a dispatch call, also known as a "walkie-talkie" type of call, is a half-duplex call where only one party at a time is able to speak. These types of calls are now offered by a variety of service providers, one of which is Sprint Nextel where these services are marketed under the trade names of Push-To-Talk (PTT) and Direct Connect.

As discussed above, a variety of service providers now offer dispatch calls and, additionally, various technologies are utilized for providing these types of calls. Certainly, different service providers may utilize different technologies and some service providers may even utilize different technologies in their own network for providing these types of calls to their subscribers. As can be understood, there is a need to be able to communicate across these different technologies when any particular calling party utilizing one technology desires to communicate with a called party utilizing a different technology in a dispatch call. Whereas these different technologies are generally interoperable, not all of the functional features associated with a communications device operating on one technology are available on a communications device operating on a different technology. This can present problems when these two communications devices are communicating with each other in a dispatch call and one communications device desires to use a functionality that is not available to the other communications device. Even in this circumstance where a communications device does not have the subject functionality, and thus cannot use the functionality, the use of the functionality by the other communications device may impact the communications device that does not have this functionality.

For example, in Sprint Nextel's communications network for dispatch calls, one subscriber may be utilizing the Integrated Digital Enhanced Network (iDEN) technology, as provided by Motorola, and another subscriber may have been migrated from the iDEN technology to a new 3G technology, e.g., a code division multiple access (CDMA) technology known as QChat and as provided by Qualcomm. Whereas these two different technologies are interoperable with each other, the QChat user may have functionalities available to his/her communications device that are not available to the iDEN user. This can present problems when the two subscribers are involved in a dispatch call with each other.

When the iDEN user is communicating with the QChat user in a dispatch call, either in a one-to-one call or a group call with other parties, the QChat user has the ability to select an "add member" functionality on their handset. This functionality enables the QChat user to add another QChat user or another add member Push-to-Talk capable user, e.g., Push-to-Talk over cellular user, to the dispatch call. However, the iDEN technology does not support this add member functionality. Therefore, during a dispatch call between the QChat user and the iDEN user where the QChat user has used the add member functionality to add another party to the call, the iDEN user will not be informed of the newly added call participant. This results in an unusual, and undesirable, calling experience for the iDEN user as it may result in the iDEN user hearing audio from the newly added call participant, but yet not receive any indication on their communications device to alert the iDEN user that the new participant has been added to the call, or it may result in the dispatch call being terminated immediately. This lack of identification is in contrast to the identification that any other QChat user who may be present on the call would receive when a new participant is added. The add member functionality of the QChat technology provides an indication to all QChat participants in the call that a new call participant has been added to the call. The add member functionality displays the newly added participant's talker ID on the communications devices of the QChat participants.

In addition to this situation providing a potentially undesirable user experience for the iDEN user, it may also present problems if the iDEN user is under surveillance by law enforcement officials, for example, under the provisions of the Communications Assistance for Law Enforcement Act (CALEA). In this circumstance, because the iDEN user, and thus the iDEN network, is not informed of who the newly added participants to the call are, the IDEN network may not be able to identify who the iDEN user may be talking to in the call for CALEA monitoring purposes.

Therefore, it would be desirable to provide an improved system and method for operating a user functionality in a mobile communications device, particularly where the functionality is available to one participant in a communication and not available to another participant.

SUMMARY OF THE INVENTION

In accordance with an embodiment of a system of the present invention, a system for operating a user functionality in a mobile communications device is provided. The system includes a communications infrastructure wherein the communications infrastructure provides interoperability between a first communications network utilizing a first technology and a second communications network utilizing a second technology. The communications infrastructure provides an indicator to a mobile communications device in communication with the first communications network wherein the indicator provides an indication to the mobile communications device to either activate the user functionality or deactivate the user functionality.

In accordance with an embodiment of a method of the present invention, a method for operating a user functionality in a mobile communications device is provided. The method includes providing an indicator to a mobile communications device in communication with a first communications network utilizing a first technology by a communications infrastructure. The communications infrastructure provides interoperability between the first communications network and a second communications network utilizing a second technology. The user functionality is activated if the indicator is provided in a first state and the user functionality is deactivated if the indicator is provided in a second state.

DETAILED DESCRIPTION OF THE EXEMPLARY EMBODIMENTS

Figure 1:
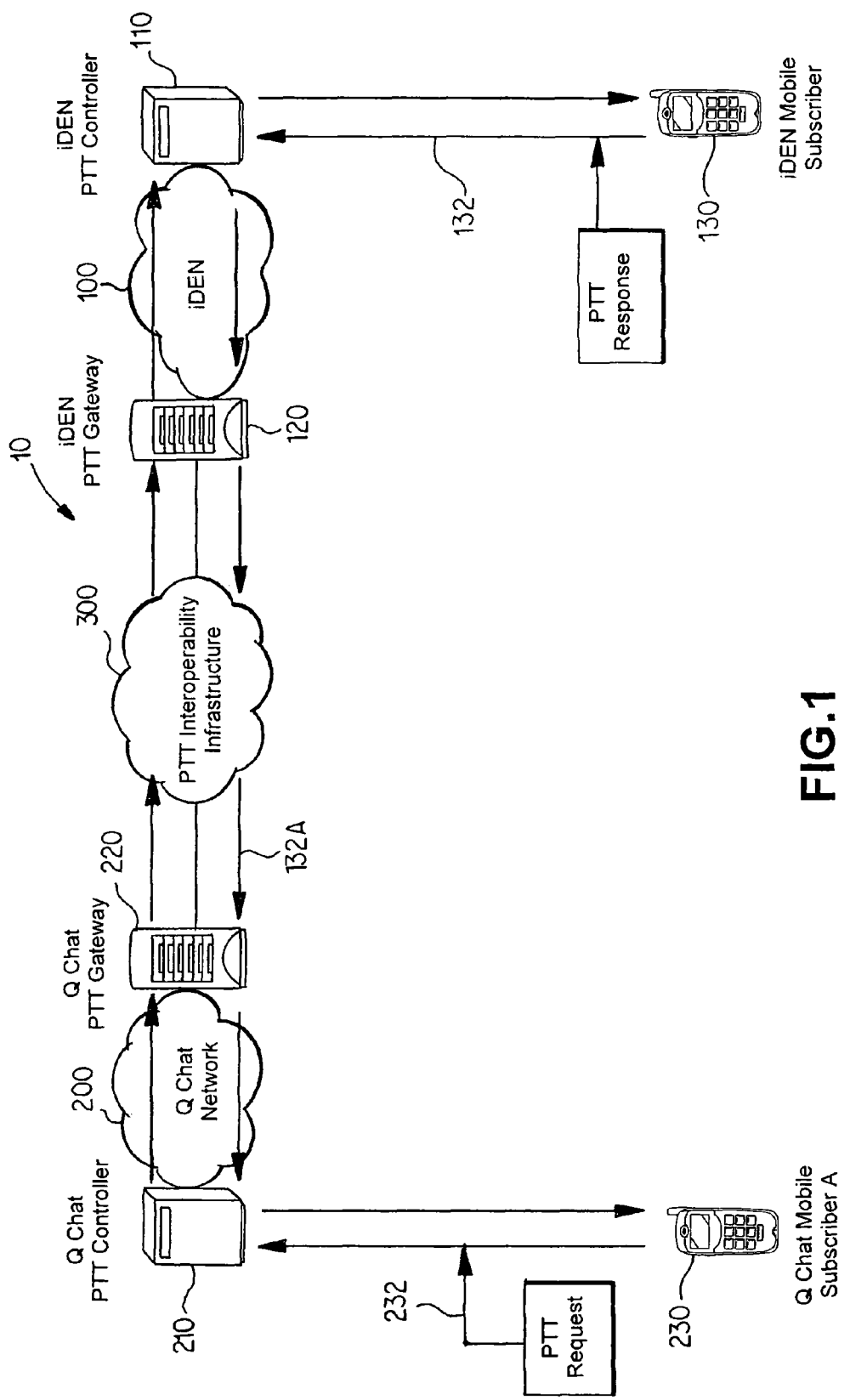
FIG. 1 illustrates an embodiment of a system of the present invention with a first call flow.

FIG. 1 illustrates an embodiment of a system of the present invention for operating a user functionality in a mobile communications device. As will be discussed further in this specification, in this embodiment, the user functionality is an add member functionality. The add member functionality provides the capability for a participant in a dispatch communication with another participant(s) to add an additional participant(s) to the dispatch call.

Communications environment 10 provides dispatch communication services to subscribers of a service provider network(s). As discussed previously, dispatch voice services are half-duplex communications where only one party at a time is able to speak. However, dispatch services can also include non-voice services, such as a push-to-X service, where X can be any PTT application, e.g., Push-to-sports, Push-to-weather, Push-to-stock quotes, where data is provided to a mobile communications device of a subscriber from a dispatch application server. Whereas FIG. 1 does not illustrate such a dispatch application server, it can be understood that a mobile communications device is able to communicate with a dispatch application server through the architecture of FIG. 1.

In communications environment 10, a first communications network 100 that utilizes a first technology is interoperable with a second communications network 200 that utilizes a second technology. A communications infrastructure 300 provides interoperability between the respective technologies of the first and second networks. In this exemplary embodiment, the first network 100 utilizes the iDEN technology and includes an iDEN PTT controller 110 and an iDEN gateway 120. As is known, the iDEN PTT controller interfaces with a mobile communications device 130 and the iDEN gateway 120. The iDEN gateway interfaces with the interoperability infrastructure 300.

Also in communications environment 10, a second communications network 200 that utilizes a second technology is interoperable with the first communications network 100 through communications infrastructure 300. In this exemplary embodiment, the second network 200 utilizes a code division multiple access (CDMA) technology, as provided, for example, by Qualcomm with its QChat technology. Similar to network 100, second network 200 also includes a QChat controller 210 and a QChat gateway 220. The QChat controller interfaces with a second mobile communications device 230 and the QChat gateway 220. The QChat gateway interfaces with the interoperability infrastructure 300.

Thus, as can be understood, dispatch communication services can be provided over both of networks 100 and 200, and these networks are interoperable with each other through interoperability infrastructure 300 to provide dispatch communication services between these networks.

In FIG. 1, a call flow is provided in the communications environment for a dispatch communication between mobile communications device 230 and mobile communications device 130. In this call flow, mobile device 230 initiates the call to device 130. As such, a dispatch call request 232 is sent from device 230 though the illustrated devices to device 130. Upon receipt, device 130 sends a dispatch response 132 though the illustrated devices on a reverse path where it is received at device 230. In this circumstance where a dispatch call is established between device 230 and device 130, where these devices utilize different network technologies, problems can result as discussed above. For example, each network technology may have functional capabilities associated with it that are not available in the other network.

In further describing the present invention, assume that in network 200 a functional capability is available to mobile device 230 that is not available in network 100 to mobile device 130. For illustrative purposes, as discussed above, assume that an add member functionality is available at device 230 for the user of that device. Thus, the QChat network has this functionality and the iDEN network does not. As discussed previously, with this add member capability, the QChat user has the ability to select an "add member" functionality on their handset. This functionality enables the QChat user to add another QChat user or another add member Push-to-Talk capable user, e.g., Push-to-Talk over cellular user, to the dispatch call. However, as also discussed previously, because the iDEN technology does not support the add member functionality, during a dispatch call between the QChat user and the iDEN user, where the QChat user has used the add member functionality to add another party to the call, the iDEN user, and any other iDEN user participants in the call, e.g., in a group call, will not be informed of the newly added call participant. This is in contrast to the identification that any other QChat user(s) who may be present on the call would receive when a new participant is added. In order to prevent this undesirable situation, the present invention either enables or disables this feature in the mobile communications device 230 based on whether the other communications device in the call has this capability. If the other communications device does not have this capability, the capability is disabled in device 230. If the other communications device does have this capability, the capability is enabled in device 230. In this manner, the capability is enabled only if both devices, or all devices, have this capability and is disabled if they do not. As such, the undesirable user experience, and the potential problems regarding CALEA monitoring, can be avoided.

In further illustrating the present invention, for the call flow in FIG. 1, when the response 132 from mobile device 130 is received at interoperability interface 300, the interoperability interface adds a flag indicator to the response 132. Thus, response 132A with the flag indicator is provided to QChat gateway 220. If, as in this circumstance, mobile device 130 does not also support the same functionality as is available in device 230, the flag indicator is set in a state to provide an indication to network 200 and QChat gateway 220 such that this functionality is turned off in mobile device 230. As such, this capability will not be provided to the user of mobile device 230 and, therefore, the user will not be able to add a participant to the dispatch communication. This prevents the user using communications device 130 from having a call participant added to the call without them knowing the identification of the added call participant. This also prevents the potential CALEA problems discussed above if the call participant with communications device 130 is under surveillance.

In the present invention, the interoperability infrastructure 300 can determine whether or not a communications device has a subject functionality because the infrastructure knows what technologies the interoperable networks are using and the capabilities associated with these technologies. Thus, the infrastructure can set the flag indicator as appropriate in the dispatch response message. The flag indicator can be set in a first state if the capability is to be enabled and set in a second state if the capability is to be disabled. In the present invention, the flag indicator is not limited to any particular form or format. All that is required is that an indicator be provided to the network with a certain functionality such that the functionality can be either enabled or disabled based on whether this functionality is available in a network with which the network with the functionality is communicating. Of course, if multiple participants are involved in a dispatch communication, e.g., a group call, the response message from each participant would include such an indicator. The functionality would be enabled only if all participants had the subject functionality.

Figure 2:
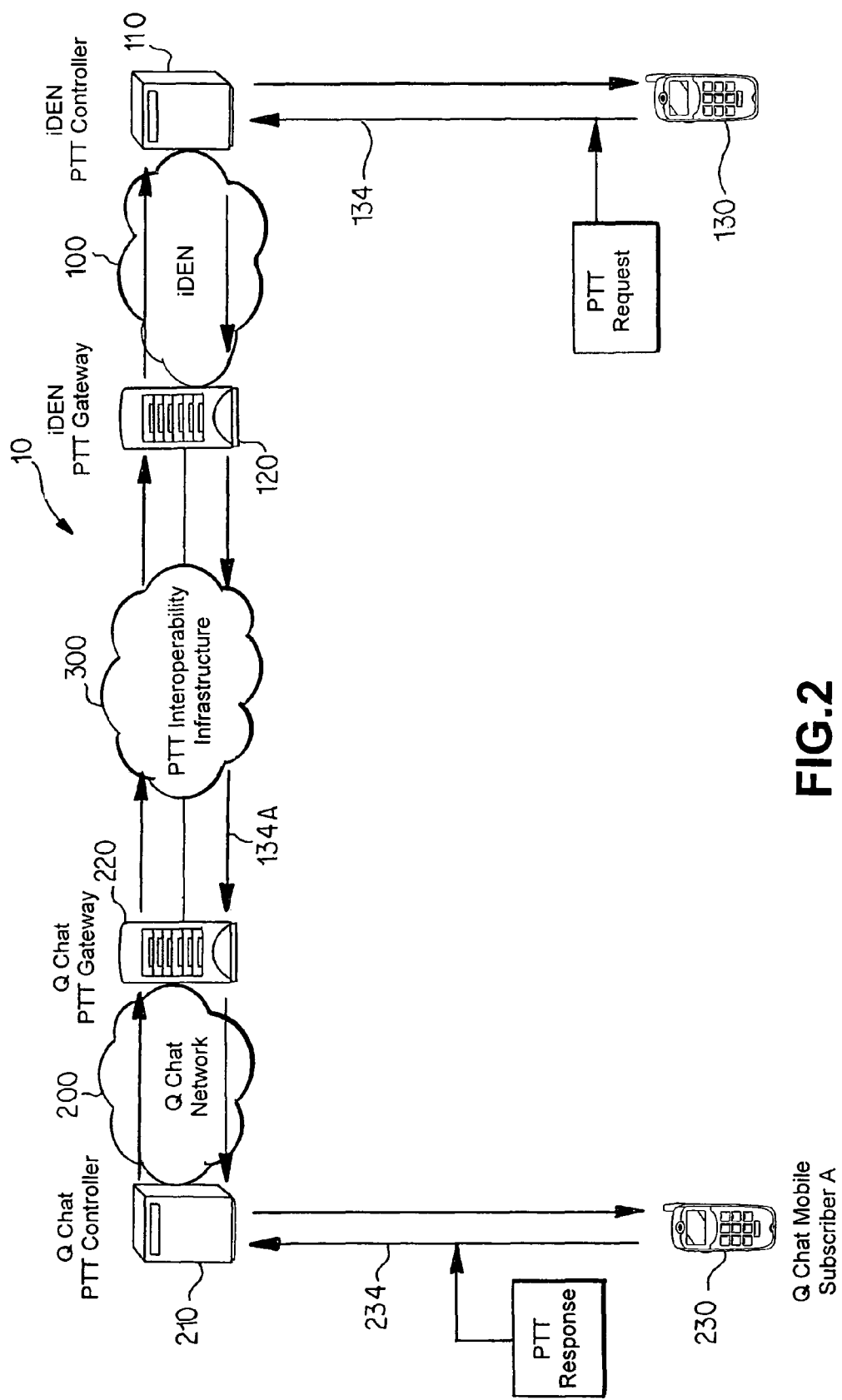
FIG. 2 illustrates the embodiment of the system of FIG. 1 with a second call flow.

FIG. 2 illustrates the embodiment of FIG. 1 with a second call flow where communications device 130 initiates the dispatch communication with device 230. In this circumstance, when the call request 134 is sent from device 130 to device 230, the infrastructure 300 adds the flag indicator to request 134 such that a request message with a flag indicator 134A is provided to network 200. In this circumstance, as in the circumstance illustrated in FIG. 1 with a different call flow, since mobile device 130 does not also support the same functionality as is available in device 230, the flag indicator is set in a state to provide an indication to network 200 and QChat gateway 220 such that this functionality is turned off in mobile device 230. As such, this capability is not provided to the user of mobile device 230 and, therefore, the user will not be able to add a participant to the dispatch communication.

Therefore, regardless of any particular call flow, in the present invention, a functionality can be either enabled or disabled based on whether this functionality is available in a network with which the network with the functionality is communicating.

Whereas in the embodiment of FIGS. 1 and 2 the device 130 is disclosed as a phone, as discussed previously, the present invention can be practiced where a dispatch caller is communicating with a dispatch application server for dispatch services or any other type of dispatch device. Thus, device 130 could be a server instead of a phone or a desktop computer in a dispatch-to-desktop (D2D) application. Of course, the network(s) supporting these devices would have appropriate technology. In these exemplary embodiments of the dispatch application server and D2D application, the functionality would be enabled in the communications device. However, again, in the present invention, regardless of whether a dispatch call participant is communicating with another phone or a server, or any other type of dispatch communications device, a functionality in a device can be either enabled or disabled based on whether this functionality is available in a network with which the network with the functionality is communicating.

Further, whereas the present invention has been discussed in the context of an "add member" functionality, the present invention can be practiced with any other functionality. The present invention has utility for enabling or disabling a functionality in a network based on whether this functionality is available in another network regardless of what the subject functionality is. Further yet, the present invention can be practiced with any of a variety of types of networks and any of a variety of types of technologies may be utilized by these networks. For example, whereas dispatch communication networks and iDEN and QChat technologies are disclosed in an embodiment, the present invention can be practiced where any type of network with any type of technology is communicating with another network with associated technology. For example, the present invention can be practiced where one of the networks utilizes a push to talk over cellular (PoC) technology or a 4G technology. In this exemplary embodiment, the functionality would be enabled in the communications device. Again, the present invention will enable or disable a functionality in a network based on whether this functionality is available in a network with which the network with the functionality is communicating.

Further yet, the present invention is not limited to how the functionality is enabled or disabled in the mobile communications device. For example, the indicator can be provided to the mobile communications device itself through the associated network for enabling or disabling the functionality or can be provided to the associated network for further communication with the device for enabling or disabling the functionality. In either event, the interoperability infrastructure provides an indicator to the device where the indicator provides an indication to the device to either activate the user functionality or deactivate the user functionality.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for operating a user functionality in a mobile communications device, comprising:
 a communications infrastructure;
 wherein the communications infrastructure provides interoperability between a first communications network utilizing a first technology and a second communications network utilizing a second technology and wherein the first and second communications networks provide dispatch calling services;
 wherein the communications infrastructure provides an indicator to a first mobile communications device in communication with the first communications network;
 wherein the indicator provides an indication to the first mobile communications device to either activate the user functionality or deactivate the user functionality based on whether a second mobile communication device in communication with the second communication network supports the user functionality; and
 wherein the user functionality provides a capability to add a participant to an existing dispatch call between the first mobile communications device and the second mobile communications device.

2. The system according to claim 1, wherein the first technology is a code division multiple access (CDMA) technology.

3. The system according to claim 2, wherein the second technology is an integrated digital enhanced network (iDEN) technology.

4. The system according to claim 3, wherein the indicator provides an indication to the mobile communications device to deactivate the user functionality.

5. The system according to claim 2, wherein the second technology utilizes push to talk over cellular (PoC) technology.

6. The system according to claim 5, wherein the indicator provides an indication to the mobile communications device to activate the user functionality.

7. The system according to claim 2, wherein the second technology utilizes dispatch to desktop (D2D) technology.

8. The system according to claim 7, wherein the indicator provides an indication to the mobile communications device to activate the user functionality.

9. A method for operating a user functionality in a mobile communications device, comprising the steps of:
 providing an indicator to a first mobile communications device in communication with a first communications network utilizing a first technology by a communications infrastructure, wherein the communications infrastructure provides interoperability between the first communications network and a second communications network utilizing a second technology and wherein the first and second communications networks provide dispatch calling services;

activating the user functionality if the indicator is provided in a first state; and deactivating the user functionality if the indicator is provided in a second state;

wherein the first state and the second state are based on whether a second mobile communication device in communication with the second communications network supports the user functionality, and wherein the user functionality provides a capability to add a participant to an existing dispatch call between the first mobile communications device and the second mobile communications device.

10. The method according to claim 9, wherein the first technology is a code division multiple access (CDMA) technology.

11. The method according to claim 10, wherein the second technology is an integrated digital enhanced network (iDEN) technology.

12. The method according to claim 11, wherein the indicator is provided in the second state.

13. The method according to claim 10, wherein the second technology utilizes push to talk over cellular (PoC) technology.

14. The method according to claim 13, wherein the indicator is provided in the first state.

15. The method according to claim 10, wherein the second technology utilizes dispatch to desktop (D2D) technology.

16. The method according to claim 15, wherein the indicator is provided in the first state.

\* \* \* \* \*